May 23, 1933.                    W. BOHNE                    1,910,317
                                  COMPASS
                              Filed Feb. 19, 1930
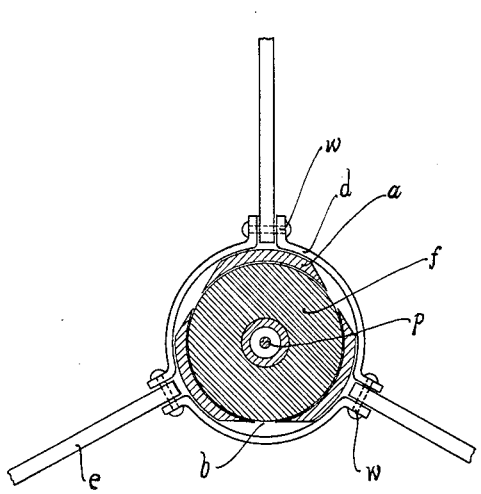
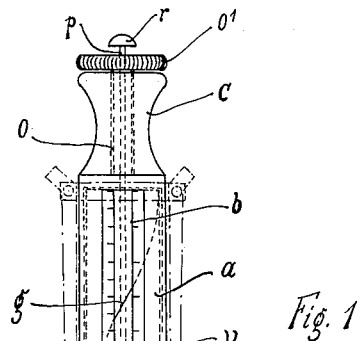
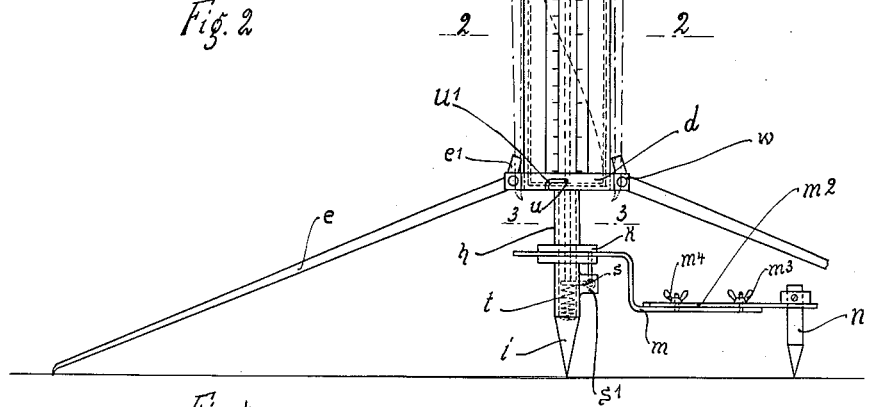
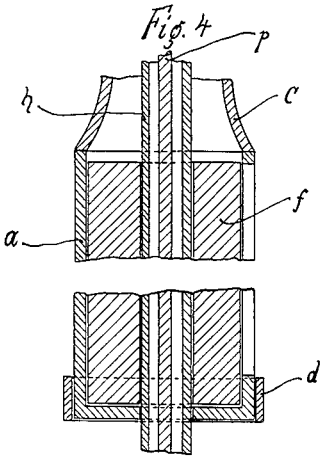
Wilhelm Bohne
by C. P. Goepel
his Attorney.

Patented May 23, 1933

1,910,317

UNITED STATES PATENT OFFICE

WILHELM BOHNE, OF GELSENKIRCHEN, GERMANY

COMPASS

Application filed February 19, 1930, Serial No. 429,538, and in Germany April 30, 1929.

My invention relates to improvements in compasses, and the object of the improvements is to provide compasses by means of which circles, angles or other fields drawn on drawing paper or the like may be divided into equal sections. With this object in view my invention consists in embodying the principle disclosed in my copending application Ser. No. 390,236 filed 4th Sept. 1929 for improvements in apparatus for dividing the circumference of a circle or a cylinder into sections of equal length, in compasses. Thus my improved compasses consist of a pair of cooperating members rotatable relatively to each other and one carrying a spiral of uniform pitch and the other a scale cooperating with said spiral, and means for supporting said members on a surface coaxially of the field to be divided, and a pointer carried by the rotary member in position for marking divisions on the said surface. In the preferred embodiment of the invention the compasses comprise a cylinder carrying a helical line and provided with a point and an arm carrying a stylus or pencil, and a stationary support provided with a scale disposed longitudinally of the cylinder in position for cooperating with the helical line, said point and stylus or pencil being adapted to engage the drawing surface, and the cylinder being rotated through angles determined by the scale marks and the helical line for setting the stylus or pencil into dividing positions.

For the purpose of explaining the invention an example embodying the same has been shown in the accompanying drawing, in which the same letters of reference have been used in all the views to indicate corresponding parts. In said drawing, Fig. 1 is an elevation showing the apparatus, Fig. 2 is a sectional plan view taken on the line 2—2 of Fig. 1, Fig. 3 is a sectional plan view taken on the line 3—3 of Fig. 1, and Fig. 4 is a partial sectional elevation showing the cylinder carrying the helical line and the tubular support enclosing the same and provided with the relatively fixed scale.

In the example shown in the drawing the apparatus comprises a pipe $a$ formed with one or more longitudinal slots $b$ and having a head or handle $c$ fixed to its top. On the pipe $a$ a ring $d$ is mounted which is formed with three eyes $w$ having legs $e$ jointed thereto, the said legs being provided with upwardly directed arms $e^1$ adapted to bear on the outer surface of the pipe $a$ for being fixed in supporting position, as is shown in Fig. 1. The ring $d$ is adapted to be fixed in position at the bottom end of the pipe $a$ by means of a pin $u$ fixed to the pipe $a$ and engaging in an angular slot $u^1$ of the ring, and it is adapted to be shifted upwardly and into the position shown in broken lines in Fig. 1 with the legs bearing on the pipe $a$. Within the pipe $a$ a cylinder $f$ is rotatable which is provided with a helical line $g$. The cylinder $h$ is directly attached to or may be integral with the cylinder $f$, and has its upper end connected to milled disk $o^1$. The bottom portion of cylinder $h$ is reduced to a point $i$ so that when the milled disk $o^1$ is turned the cylinder $f$ is also rotated therewith. The reduced bottom part $h$ of the said cylinder ends in a point $i$, and to the said reduced bottom part a ring $k$ is fixed which is formed at opposite sides with slots or recesses $k^1$. In the said slots $k^1$ the bifurcated end $m^1$ of a radial arm $m$ is guided which is connected with an arm $m^2$ by means of screws $m^3$ fixed to the arm $m$ and passed through a slot $m^4$ of the arm $m^2$. To the outer end of the arm $m^2$ a stylus or pencil $n$ is fixed. The point $i$ and the stylus or pencil $n$ are located relatively to each other so that both are adapted to engage the surface of the paper or the like.

The reduced upper end $o$ of the cylinder $f$ is passed through a bore of the head or handle $c$, and at its top end it carries a milled disk $o^1$. Thus, the cylinder $f$ can be rotated relatively to the pipe $a$ by means of the milled disk $o^1$, and such rotary movement is transmitted to the arm $m$, $m^2$ and the stylus $n$ carried thereby. Furthermore, said milled disk permits of adjustment of the cylinder $f$ within the pipe $a$ whereby the point marks are made by the stylus $n$.

Alongside the slot or slots $b$ the cylinder is provided with scales $v$ which preferably have graduations of different pitch, and which are adapted to cooperate with the helical line $g$. In an axial bore of the cylinder $f$ and its extensions $h$ and $o$ a rod $p$ is shiftable, which is supported at its bottom end on a coiled spring $t$, and which is formed at its top with a head $r$. The said rod bears on the horizontal arm of a bell crank lever $s$ rockingly mounted on a pair of eyes $s^1$ fixed to the extension $h$. The upwardly directed arm of the said bell crank lever engages in a bore $s^2$ of the bifurcated end $m^1$ of the arm $m$, and moves stylus $n$ to make a radial graduating mark.

The apparatus is used as follows:

If it is desired to divide a circle into equal sections the ring $d$ of the apparatus is shifted downwardly and fixed in position by means of the pin and slot connection $u$, $u^1$, and the legs $e$ are rocked outwardly. The apparatus is placed on the drawing board with the legs $e$ bearing on the paper, and the point $i$ engaging the centre of the circle to be divided. The stylus $n$ is placed near the initial point of the circle by adjusting the length of the arm $m$, $m^2$ by means of the pin and slot connection $m^3$, $m^4$. Now the rod $p$ is pushed downwardly by pressing on the button $r$. Thereby the arm $m$, $m^2$ and the stylus $n$ are shifted inwardly by means of the bell crank lever $s$, so that a line intersecting the circle is drawn on the paper. Now the proper scale $v$ is selected the graduations of which correspond to the desired division of the circle, and the cylinder $f$ is intermittently turned by means of the milled disk $o^1$, and whenever one of the graduations of the selected scale intersects the helical line $g$ the rod $p$ is pushed downwardly for drawing a short line by means of the stylus $n$ intersecting the circle. After the cylinder $f$ has thus been turned through an angle of 360° the stylus is again in initial position and the desired number of intersecting lines has been drawn by means of the stylus on the circle.

By selecting a scale having the desired number of graduations the desired number of divisions of the circle is obtained. In the construction shown in the figures the pipe $f$ is provided with six scales, so that six different divisions or a multiple or fraction thereof of the circle can be obtained. If a greater number of divisions are desired I provide the cylinder with exchangeable scales.

While in describing the invention reference has been made to a particular example embodying the same I wish it to be understood that my invention is not limited to the construction shown in the drawing, and that various changes may be made in the general arrangement of the apparatus and the construction of its parts without departing from the invention. For example I do not limit myself to the construction in which the member carrying the helical line is rotatable and the member carrying the scale is stationary, or to the construction in which both members are disposed concentrically of each other or to an apparatus in which the spiral line is in the form of a helix.

I claim:

1. An apparatus for dividing circles or angles, comprising a pair of cooperating cylindrical members set one within the other rotatable relatively to each other and one carrying a helix and the other a scale, means for supporting said members on a surface coaxially of the field to be divided, and a pointer carried by the rotary member in position for marking divisions on the said surface.

2. An apparatus for dividing circles or angles, comprising a pair of concentric members rotatable relatively to each other and one carrying a helix and the other a scale, means for supporting said rotary member on the field to be divided and concentrically thereof, a pointer mounted on the rotary member and extending perpendicularly therefrom for marking points on said field, and means for rotating said members relatively to each other.

3. An apparatus for dividing circles or angles, comprising a pair of concentric cylindrical members rotatable relatively to each other and one carrying a helix and the other a scale, means for supporting said rotary member on the field to be divided and concentrically thereof, a pointer mounted on the rotary member in position for marking points on said field, an arm extending from said pointer carrying a stylus at its free end, and means for rotating said members relatively to each other.

4. An apparatus for dividing circles or angles, comprising a pipe provided with legs for supporting the same on a drawing surface and carrying an axial scale, a cylinder rotatable within said pipe and carrying a helical line cooperating with said scale, means for adjusting said cylinder concentrically of the field to be divided, and a pointer carried by said cylinder and extending radially therefrom in position for marking points on said field.

5. An apparatus for dividing circles or angles, comprising a pair of cooperating members rotatable relatively to each other and one carrying a helix and the other a scale, means for supporting said members on a surface coaxially of the field to be divided, and a radially extensible pointer carried by the rotary member in position for marking divisions on the said surface.

6. An apparatus for dividing circles or angles, comprising a pair of cooperating members rotatable relatively to each other and one carrying a helix and the other a scale, means for supporting said members on a surface coaxially of the field to be divided, a pointer carried by the rotary member in position for marking divisions on the said surface, and means for shifting said pointer radially for producing a mark on said field.

7. An apparatus for dividing circles or angles, comprising a pipe provided with legs for supporting the same on a drawing surface and carrying an axial scale, a concentrically mounted cylinder rotatable within said pipe and carrying a helical line cooperating with said scale, means for adjusting said cylinder concentrically of the field to be divided, a pointer carried by said cylinder in position for marking points on said field, a rod located axially within said cylinder, and levers acted upon by said rod and connected with said pointer for moving the same for marking a radial line on said field.

8. An apparatus for dividing circles or angles comprising a pair of concentrically disposed cooperating rotatable members, one carrying a helix and the other a graduated scale, a movable pointer on one of said members adapted to bear down and mark radial divisions upon a circle in accordance with the setting of the helix and scale of said members.

In testimony whereof I hereunto affix my signature.

WILHELM BOHNE.